United States Patent [19]

Zhou et al.

[11] Patent Number: 5,533,180
[45] Date of Patent: Jul. 2, 1996

[54] METHOD OF MANIPULATING FONTS CONTAINING LARGE NUMBERS OF CHARACTERS

[75] Inventors: Frank H. Zhou; Qin-Mo Wang, both of Vancouver, Canada

[73] Assignee: Top Computech Co. Ltd., Canada

[21] Appl. No.: 224,585

[22] Filed: Apr. 7, 1994

[51] Int. Cl.$^6$ .................................................. G06F 15/00
[52] U.S. Cl. .......................................... 395/150; 395/155
[58] Field of Search .................................... 395/150, 151, 395/156–158, 160, 161; 345/141, 143, 192–195

[56] References Cited

PUBLICATIONS

Cameron, "ComputerLand introduces Chinese language computing", *Newsbytes*, Jun. 7, 1993.
"Chinese Star", 1993 brochure of Dorak Intl. Inc., San Gabriel, CA.
"Dorak", undated brochure of Dorak Intl. Inc., San Gabriel, CA [Chinese language—no translation available].
"Chinese Star for Windows", undated brochure of Dorak Intl. Inc., San Gabriel, CA [Chinese language—no translation available].
"HanWenDao", undated brochure of Sinosoft Systems Ltd., Vancouver, B.C., Canada.
"Our Computer Player" newspaper, 18 Feb. 1994, pp. 41–42 including p. 41 Chinese language article respecting font manipulation software and advertisements (pp. 41 & 42) of TwinBridge and HanWenDao products.
"Top Solutions For Chinese Desktop Publishing", undated brochure of Top Computech Co., Ltd., Vancouver, B.C., Canada.
Undated poster of Top Computech Co. Ltd., Vancouver, B.C., Canada.
1992–93 Eurasian Software Catalog, Pacfic Rim Connections, Inc., Burlingame, CA.
"Topfonts Applications", 1991 catalog of Top Computech Co. Ltd., Vancouver, B.C., Canada.
"TopFonts & TopBridge User Manual", 1993 publication of Taisim International Limited, Hong Kong.
"TopFonts For Windows", undated user manual.
"TopFonts & TopBridge" user manual for PageMaker, Ventura, CorelDRAW!, . . ., undated manual of Top Computech Co. Ltd., Vancouver, B.C., Canada.

*Primary Examiner*—Heather R. Herndon
*Assistant Examiner*—Joseph R. Burwell
*Attorney, Agent, or Firm*—Oyen Wiggs Green & Mutala

[57] ABSTRACT

A method of enabling a computer user to manipulate, as one font, an arbitrary number of special characters exceeding the 256 characters which single byte font schemes can represent in one font. The invention takes advantage of the user-activatable font management capabilities built into popular application programs, such as a mechanism for switching between different standard character fonts; and, a font display mechanism for enabling the user to monitor the font switching procedure. The special characters are divided into font segments, with each segment containing a number "X" (less than 256) characters. The segments are stored for subsequent retrieval. Each character input by the user is scanned to determine whether it is one of the special characters. Non-special characters are passed without further action. If a special character is detected, the stored font segment containing that character is identified to see if it is the font currently in use by the program. If so, control passes to the application program. Otherwise, the font switching mechanism is activated to select the font segment containing the input character as the current font. As this is done, activation of the font display mechanism is suppressed so that the font switching occurs in a manner transparent to the user. Control then passes to the application program.

7 Claims, 10 Drawing Sheets

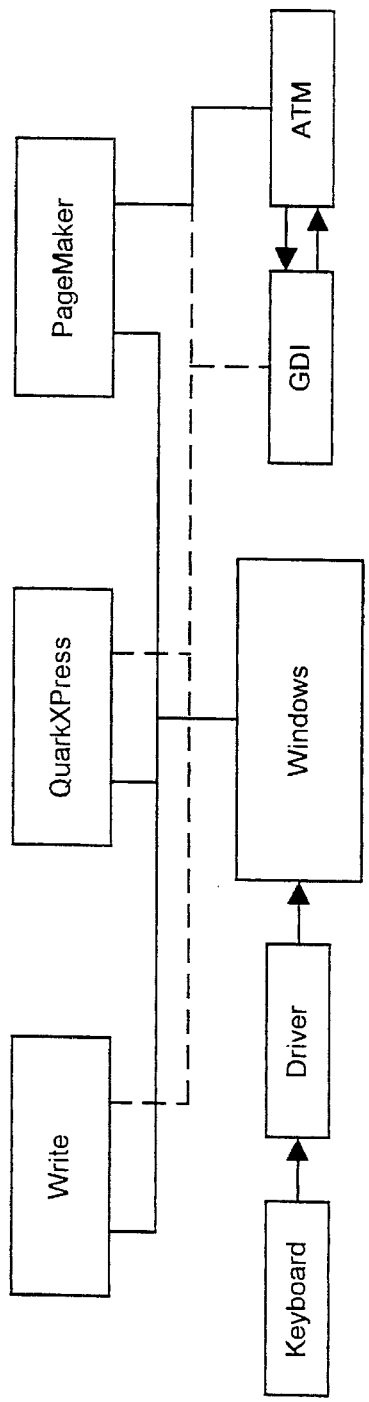
Figure 1 (a) Prior Art
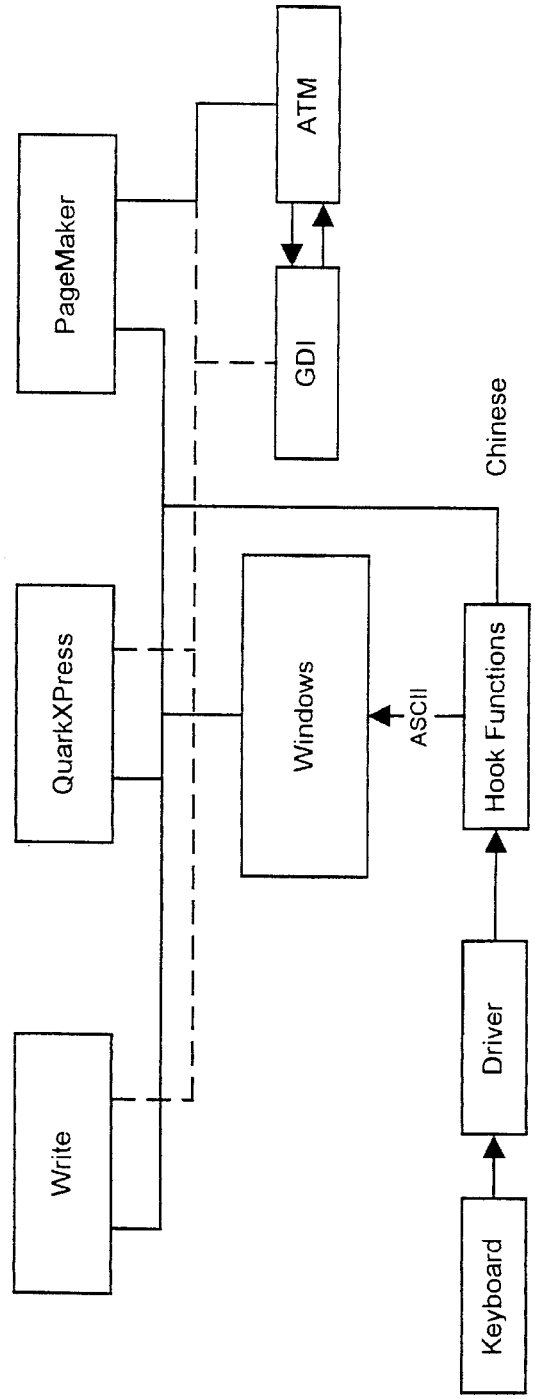
Figure 1 (b)

| Virtual Font | Real Font | 1 ⟵⟶ 256 |  |  |  |  |  |
|---|---|---|---|---|---|---|---|
| Arial = | Arial | ... | A | B | ... | y | z | ... |
| Courier = | Courier | ... | A | B | ... | y | z | ... |
| ... | ... |  |  |  |  |  |  |
| Fang-Song | Fang-Song real font-segment 1 | ... | 分 | 生 | ... | 表 | 着 | ... |
|  | Fang-Song real font-segment 2 | ... | 发 | 成 | ... | 在 | 了 | ... |
|  | ... |  |  |  |  |  |  |
|  | Fang-Song real font-segment n | ... | 民 | 可 | ... | 我 | 以 | ... |
|  | ... |  |  |  |  |  |  |
| Hei-Ti | Hei-Ti real font-segment 1 | ... | 分 | 生 | ... | 表 | 着 | ... |
|  | Hei-Ti real font-segment 2 | ... | 发 | 成 | ... | 在 | 了 | ... |
|  | ... |  |  |  |  |  |  |
|  | Hei-Ti real font-segment n | ... | 民 | 可 | ... | 我 | 以 | ... |
|  | ... |  |  |  |  |  |  |
|  |  |  |  |  |  |  |  |
| Song-Ti | Song-Ti real font-segment 1 | ... | 分 | 生 | ... | 表 | 着 | ... |
|  | Song-Ti real font-segment 2 | ... | 發 | 成 | ... | 在 | 了 | ... |
|  | ... |  |  |  |  |  |  |
|  | Song-Ti real font-segment n | ... | 民 | 可 | ... | 我 | 以 | ... |
|  | ... |  |  |  |  |  |  |

Figure 3

| Virtual Font | Real Font | 1 ←————————→ 256 | | | | | |
|---|---|---|---|---|---|---|---|
| Arial = | Arial | ... | A | B | ... | y | z | ... |
| Courier = | Courier | ... | A | B | ... | y | z | ... |
| ... | ... | | | | | | |
| Fang-Song | Fang-Song real font-segment 1 | ... | 分 | 生 | ... | 表 | 着 | ... |
| | Fang-Song real font-segment 2 | ... | 发 | 成 | ... | 在 | 了 | ... |
| | ... | | | | | | |
| | Fang-Song real font-segment n | ... | 民 | 可 | ... | 我 | 以 | ... |
| | ... | | | | | | |
| Hei-Ti | Hei-Ti real font-segment 1 | ... | 分 | 生 | ... | 表 | 着 | ... |
| | Hei-Ti real font-segment 2 | ... | 发 | 成 | ... | 在 | 了 | ... |
| | ... | | | | | | |
| | Hei-Ti real font-segment n | ... | 民 | 可 | ... | 我 | 以 | ... |
| | ... | | | | | | |
| | | | | | | | |

Figure 6

METHOD OF MANIPULATING FONTS CONTAINING LARGE NUMBERS OF CHARACTERS

FIELD OF THE INVENTION

This application pertains to computer manipulation of font character sets in a manner which gives computer users the convenience of working with a single font containing potentially thousands of characters (such as Chinese characters) while the computer works with multiple font sets, each containing only 256 characters.

BACKGROUND OF THE INVENTION

Computers were originally designed to handle natural languages (principally English) which utilize comparatively small numbers of characters. For example, the set of characters commonly found on English language keyboards comprising the upper case letters A–Z, lower case letters a–z, digits 0–9, plus a few punctuation marks and other special characters normally suffice to enable English speakers to interact with computers. A "font" is a complete group of such characters presented in the same style (i.e. typeface) and size.

Western computer designers have standardized fonts to consist of 256 characters per font. This presents a problem to users who wish to interact with computers in other languages having many more characters than English. For example, the Chinese language has over 15,000 characters in contemporary use, with about 3,000 of those being in everyday use. Fonts restricted to 256 characters are clearly inadequate to represent a useful range of Chinese characters.

A single eight-bit "byte" of information can uniquely represent any one of the possible 256 different characters in a conventional English character font. Since computers can conveniently manipulate information in bytes, this largely explains why Western designers elected to restrict themselves to 256 characters per font. However, two bytes are required to uniquely represent any one of the possible different characters in a single font of Chinese characters. (Two bytes, consisting of 16 bits, can uniquely represent any one of 65,536 possible different characters, which is more than adequate to cover the complete range of Chinese characters). Chinese software developers have accordingly developed "dual-byte" font schemes to enable users to interact with computers in Chinese.

Font-handling technology is fundamental to a computer program's ability to interact with a user in the input, display, printing of other use of characters. Western computer software, such as that designed for use with the popular Microsoft® Windows™ environment, relies upon single byte fonts consisting of only 256 characters per font. This renders Chinese dual-byte software incompatible with the Microsoft® Windows™ environment, potentially denying Chinese users the benefits of that environment and preventing them from using (in their preferred Chinese language) the many sophisticated application programs developed for that environment.

The present invention solves this problem, in a manner which is completely transparent to the computer user, by converting (or mapping) each dual-byte character font into a plurality of single-byte character font segments compatible with the Microsoft®Windows™ environment. This facilitates direct input of Chinese characters into any software which utilizes single-byte font technology.

SUMMARY OF THE INVENTION

In accordance with the preferred embodiment, the invention provides a method of interfacing between a computer user and a computer application program to enable the user to manipulate, as one font, an arbitrary number of special characters exceeding the 256 standard characters which the program can represent in one font. The invention takes advantage of the user-activatable font management capabilities built into popular application programs, such as a means for switching between different standard character fonts; and, a font switching display means for enabling the user to monitor the font switching procedure.

In its most basic form, the invention divides the special characters into font segments, with each segment containing a number "X" (less than 256) characters. The font segments are stored for subsequent retrieval. As the user inputs characters, the invention determines whether the input character is one of the special characters or not. If the input character is not one of the special characters, then control passes to the application program. If the input character is one of the special characters, the invention determines which of the stored font segments contains the input character, and determines which font is currently in use by the program. If the font segment containing the input character is the current font, then control passes to the application program. If the font segment containing the input character is not the current font, the font switching means is activated to select the font segment containing the input character as the current font. As this is done, activation of the font switching display means is suppressed so that the font switching is transparent to the user. Control then passes to the application program.

In some cases the font switching display means may be a pull down menu listing both the standard character fonts and the stored font segments, in which case the font switching means is activated by the user selecting one of the listed fonts according to its position in the list. In such case, the invention creates and stores a table identifying the position of each of the standard character fonts and each of the stored font segments in the list. This facilitates selection, as the current font, of the font segment containing the input character by examining the table to determine that segment's position in the list. The list is then opened and the font occupying the determined position selected.

In other cases the font switching display means may be a user-activated pop-up dialog box identifying the standard character fonts and the stored font segments. In such case, the invention selects the font segment containing the input character as the current font by passing to the application program a parameter representative of that font segment, while suppressing activation of the pop-up dialog box.

BRIEF DESCRIPTION OF THE DRAWINGS

FIG. 1(*a*) is a block diagram illustrating the prior art technique used to input standard single-byte characters into application software via the Microsoft® Windows™ environment.

FIG. 1(*b*) is a block diagram illustrating the technique used by the present invention to input Chinese characters into application software via the Microsoft® Windows™ environment.

FIG. 3 is a chart illustrating various fonts consisting of 256 characters each and indicating the invention's presentation, to the user, of a single "virtual" font potentially containing many thousands of characters, while the computer works with a multiplicity of "real" font segments, each containing only 256 characters.

FIG. 6 is a chart illustrating construction of virtual fonts with each Chinese character maintaining the same position in the same numbered real font segment.

DETAILED DESCRIPTION OF THE PREFERRED EMBODIMENT

Overview

Figure 2:
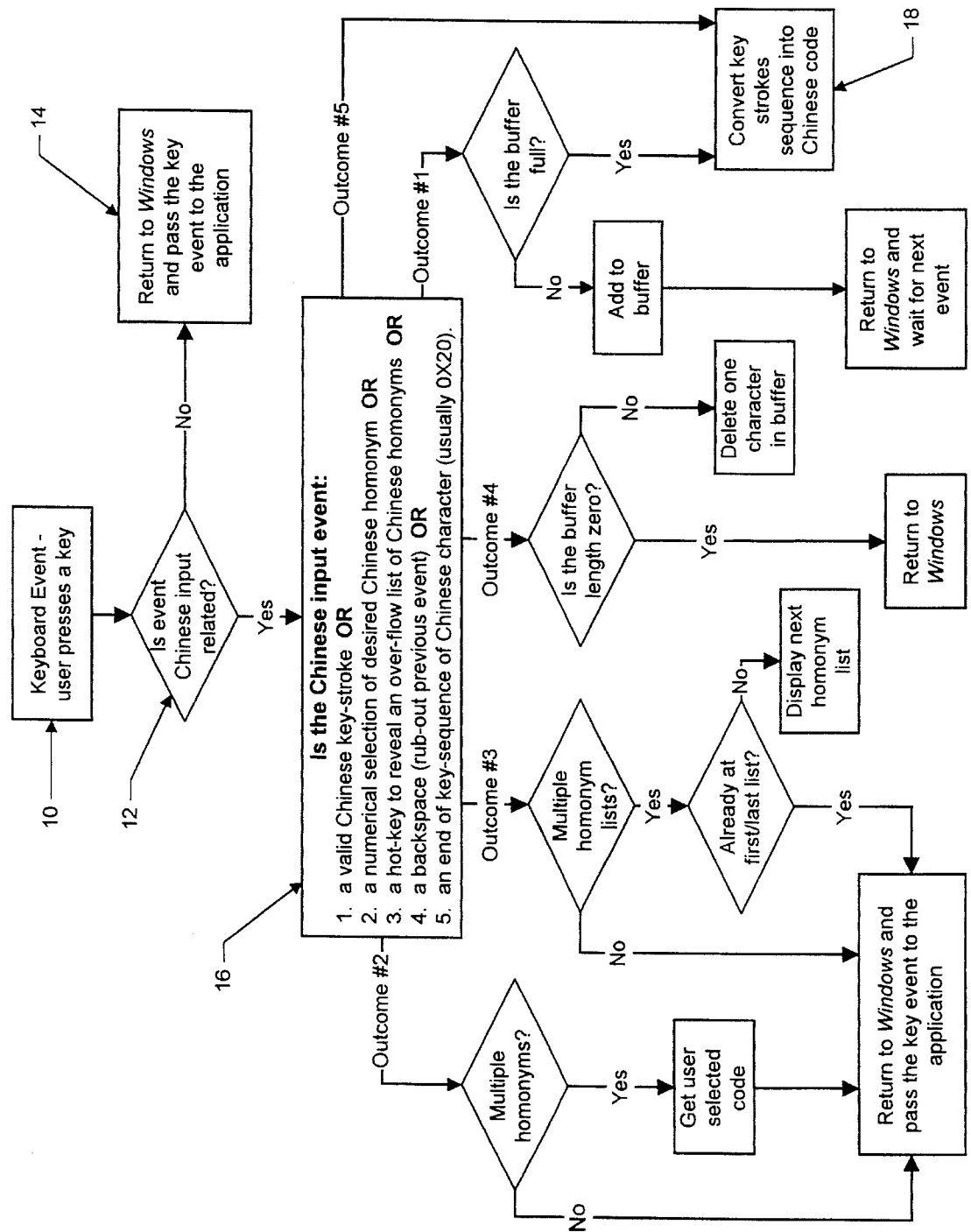
FIG. 2 is a flow chart illustrating the sequence of steps used by the present invention to input Chinese characters into application software via the Microsoft® Windows™ environment.

An input system is provided to enable Chinese speaking users to access thousands of different Chinese characters using the standard 101 key "QWERTY" keyboard familiar to English users. The input system "traps" keystroke sequences to select the desired Chinese character and its dual-byte representation. The dual-byte representation is then converted to a single-byte "virtual font" representation.

The conversion is done in a manner which is transparent to both the user and to the software application with which the user interacts. That is, if the user inspects the list of available fonts, only one virtual font name such as "Fang-Song" or "Kai-Ti" will be seen for each Chinese character font, along with any available English fonts such as "Times Roman" or "Arial". However, the underlying application software "sees", for each Chinese character virtual font, many separate "real" fonts, each consisting of only 256 characters. Thus, the user has the convenience of selecting, via appropriate input keystroke sequences, any virtual font character, without having to worry about which of the many real font segments contains that character and manually switching to that font segment. The necessary lookup and switching functions are performed by the invention.

Input System

The invention employs Windows "Hook" functions to input Chinese characters to application programs operating under the Microsoft® Windows™ environment. Such functions are a well-documented aspect of the Windows™ application programmer interface ("API") and those skilled in the art are very familiar with their use, so they need not be described in great detail here. [Further details may be obtained from the Microsoft® Windows™ Visual C++ technical documentation, the Microsoft® Windows™ System Developer's Kit ("SDK") and other similar technical documentation familiar to those skilled in the art.] Basically, as depicted in FIG. 1(a), Microsoft® Windows™ ordinarily directly receives keyboard (or mouse) input and passes it to the underlying application software (which may be one of many popular applications such as MS-Write™, QuarkXPress™, PageMaker™, etc.).

As depicted in FIG. 1(b), the invention uses Hook functions to trap input events triggered by user activation of the keyboard or mouse; and, to re-direct and/or generate substitute events to the system event queue. When program code conforming to the invention is launched under the Microsoft® Windows™ environment, it intercepts such input events and (if appropriate) substitutes key-stroke sequences and keyboard events through the use of Hook functions.

Use of Hook Functions by the Input System

Hook functions are used to trap keyboard events and to determine whether the input key sequence is a valid representation of a Chinese character. Specifically, the test is: "is this a valid representation of a Chinese character?" If the answer is "No", then the input (ASCII) key-stroke sequences are passed via Microsoft® Windows™ to the particular application software with which the user happens to be interacting. In other words, if the input key sequence does not define a valid Chinese character, the invention ignores that sequence and passes it on without modification. But, if the answer to the foregoing question is "Yes", then the input keystroke sequence is converted into the dual-byte representation of the Chinese character defined by that input sequence.

The main input problem involves homonyms (i.e. different words with different meanings, but sharing the same spelling for each valid keystroke sequence). For example, the Pin-Yin Chinese character "ma" has several homonyms, including the Chinese equivalents of the words "mother" and "horse". The conventionally adopted solution is to present the user with a list of homonym characters on a menu bar displayed at the bottom of the screen, with a unique code (typically one of the digits 0–9) adjacent to each homonym. Up to ten homonym characters are normally displayed at once, and a facility is provided to enable the user to quickly display any additional homonyms. The user selects the desired character by keying the appropriate unique homonym code on the keyboard. For example, for the character "ma", the user might type the code 1 number for "mother"; 2 for "horse" and so on. In practice, a variety of techniques are used in discriminating between homonyms, depending upon the particular input method in use. These techniques are well known to those skilled in the art, and need not be further elaborated here.

FIG. 2 illustrates the input procedure in more detail. Input box 10, decision box 12 and output box 14 depict the sequence of events previously described with respect the FIG. 1(b) for non-Chinese character input. Decision box 16 and its five output paths labelled 1–5 represent the action taken for Chinese input-related keyboard events, as follows:

1. Path 1 is taken if a valid (complete or incomplete) Chinese key-stroke sequence has been received. If the keyboard input buffer is full, control passes to output box 18 for conversion of the input sequence to the appropriate Chinese dual byte code as hereinafter described.

2. Path 2 is taken to enable user selection of a desired Chinese homonym via numerical code, as aforesaid. Note that the expected input here is a digit which can be handled in conventional fashion by the Microsoft® Windows™ environment.
3. Path 3 is taken to enable user selection of additional lists of Chinese homonyms, as aforesaid.
4. Path 4 is taken if the user strikes the backspace key to indicate that the previously-typed keyboard character is to be ignored.
5. Path 5 is taken if the user inputs a special "end of key-sequence" code—usually 0X20, whereupon control passes to output box 18 for conversion of the input sequence to the appropriate Chinese dual byte code as hereinafter described.

Mapping Double-byte Codes to Single-byte Real Font Segments

As previously indicated, each virtual font comprises, transparently to the user, a multiplicity of "real" font segments, each containing 256 characters. The various virtual fonts are established according to one of several different double-byte character code schemes which have been devised to meet the natural language needs of the Asian markets. These schemes (sometimes called "inner codes") are still in a state of flux and it is unclear which will become the ultimately accepted "standard". Each scheme represents a different strategy for manipulating large numbers of characters as a single font.

Currently popular Chinese inner codes schemes use 2 bytes to define each character, although there are some 3-byte and even 4-byte code schemes in use. For all practical purposes, however, there are only two dominant codes; namely, the "BIG-5" code established in Taiwan and the "GB" ("Guojia Biaozhun" established in the People's Republic of China. Other codes in use include the "III" (Taiwan Institute for Information Industry) code (2 and 3 bytes) and the IBM 5550 code (2 bytes).

Figure 8:
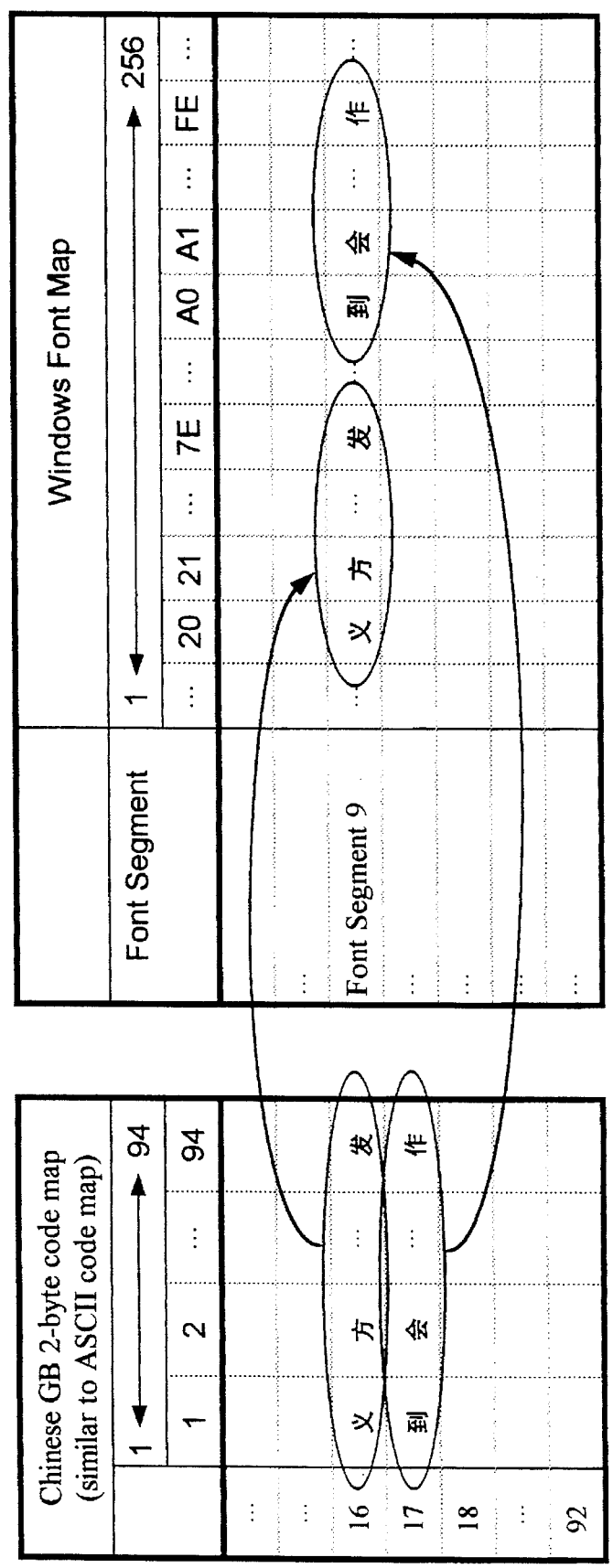
FIGS. 8 and 9 respectively depict the manner in which character codes are mapped from the "GB" or "BIG-5" code schemes to virtual fonts consisting of a multiplicity of real font segments, each such segment containing 256 characters compatible with Western computer software.
Figure 9:
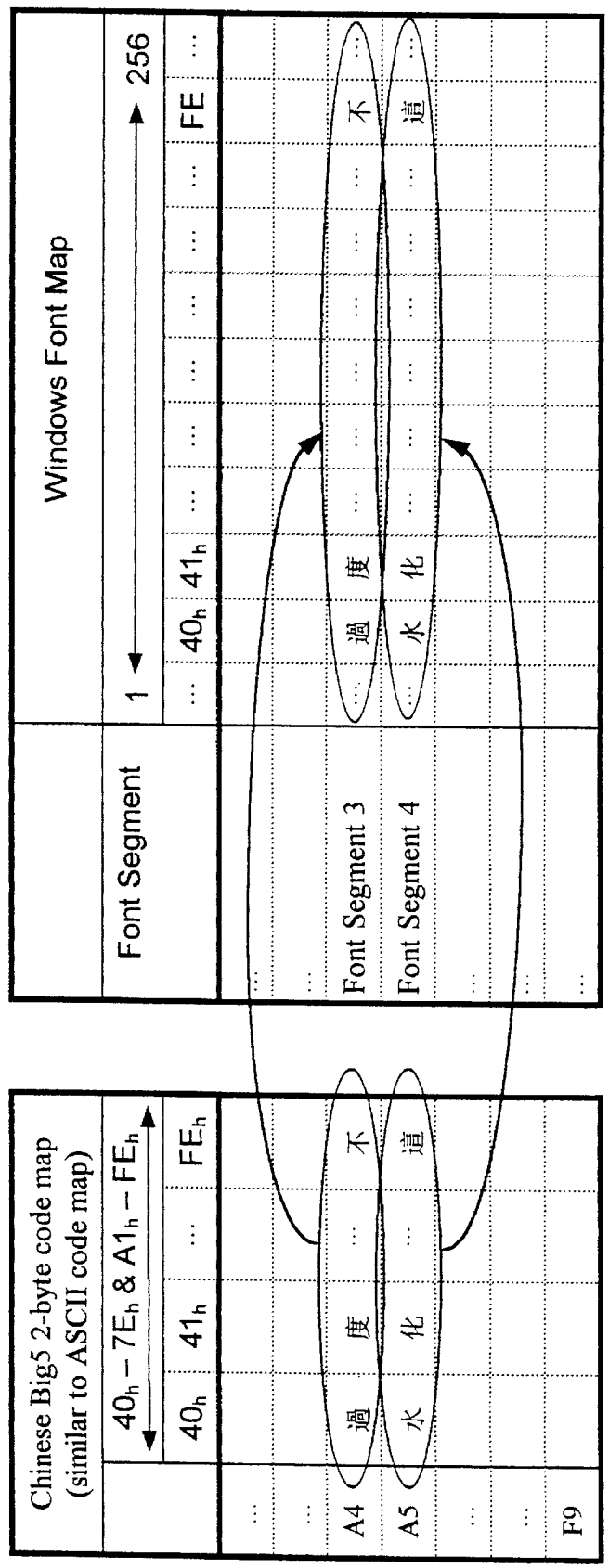

FIGS. 8 and 9 respectively depict the manner in which character codes are mapped from the "GB" or "BIG-5" code schemes to virtual fonts consisting of a multiplicity of real font segments, each such segment containing 256 characters compatible with western computer software. As illustrated, the "GB" and "BIG-5" code schemes can each be represented as a matrix of characters. For example, the "GB" scheme can be represented as a matrix of 94 columns, each having 92 rows of characters for a total of 8648 characters; and, the "BIG-5" scheme can be represented as a matrix of 157 columns, each having FA (hexadecimal) rows of characters for a total of 39,250 characters. Using the formulae shown in FIGS. 8 and 9 respectively, one may convert the row-column matrix representation of any character from either of the "GB" or "BIG-5" code schemes to establish the 1-of-256 character position and real font segment number defining that character in a virtual font consisting of a multiplicity of real font segments.

Virtual Font Management

The object of the invention is to make it as easy for a user to select a Chinese font (typeface) as it is to select a conventional 256-character English font. In other words, users may select a Chinese font such as "Fang-Song" or "Kai-Ti" from a pull-down list of fonts in precisely the same way that English speakers select familiar English fonts such as "Times Roman" or "Arial". The problem, described earlier, is the incompatibility of dual-byte Chinese character font representations with single byte 256-character fonts employed by Western software, particulary software designed for the popular Microsoft® Windows™ environment.

The invention solves this problem by using "virtual fonts". Each virtual font corresponds to one actual Chinese font containing perhaps 13,000 or more Chinese characters. Each virtual font is, transparently to the user, mapped to a multiplicity of "real" font segments, each containing 256 characters. Each real font segment may contain up to 188 Chinese characters (the remaining 68 characters being reserved for digits, punctuation and other special symbols). Thus, one virtual font containing 13,160 Chinese characters would be mapped to 70 separate real-font segments (i.e. 70×188=13,160).

FIG. 3 depicts a mixture of conventional 256 character English fonts such as "Arial", "Courier" and "Times Roman" with Chinese fonts such as "Fang-Song", "Hei-Ti", "Ti", "li", "Wei" and "Kai-Ti". The left column depicts the virtual font names seen by the user upon inspection of the font list via the font interface mechanism provided by the particular application software. The table on the right depicts, in each row, the actual 256-character real font segments seen by the software. Note that, in the case of an English font which can be completely represented in 256 characters, there is a one-to-one correspondence between the virtual and real fonts. But, in the case of a Chinese font having potentially thousands of characters, there is a one-to-many correspondence between the virtual and real fonts. That is, for each virtual Chinese font there are "n" real font segments, each consisting of 256 characters comprising up to 188 Chinese characters as aforesaid, where "n" is the number of real font segments required to represent all Chinese characters of interest.

Implementation of the Virtual Font Management Scheme

The invention switches between the various real font segments comprising a single virtual Chinese character font by mimicking font switching actions which are normally done manually by the user, while suppressing the displays that the user would see in manually activating them. The result is that the user is unaware that a real font segment change has taken place, while the underlying application has made the appropriate font change. In other words, the invention makes it appear to the application that the user has changed from one real font segment to another, when in fact the change is made automatically and transparently.

There are two way to do this, depending on the Graphical User Interface (GUI) adopted by the application with which the user wishes to interact. Some applications use pull-down menu lists to select fonts. Other applications use dialog boxes to enable users to select fonts. In either case, the invention mimics the font selection procedure.

Mimic Pull-Down Menu

Using well-documented aspects of the Windows™ application programmer interface which are very familiar to those skilled in the art, the invention generates the WM_COMMAND and wparm which are normally generated by manual selection of an item from a pull-down menu list. The application responds to these messages as though they originated from the user's manual selection from the menu bar, when in fact they are generated by the invention's virtual font manager.

There are two problems here though. The first problem is that it is necessary to suppress display of the pull-down menu. This is achieved by intercepting the change font command and suppressing display of the pull-down menu. The second problem is that the virtual font manager can only select fonts according to their position in the pull-down font menu list. Different users will typically install a different selection of fonts (mixed English and Chinese), so it is impossible to know how far down the list a particular font will appear. The position of individual fonts within the sequence of fonts in the pull-down font-list is controlled by the wparm parameter. The problem is solved by mapping all installed fonts (English fonts and Chinese real font-segments) when program code conforming to the invention is launched. This facilitates creation of a font look-up table representative of the installed library of fonts specific to the user's computer environment.

Mimic Dialog Box

In normal use, applications which allow users to change fonts via dialog boxes pop-up a font selection dialog box on receipt of an appropriate command from the user. When this happens, the application calls the Windows ChooseFonts function in Commdlg.dll (another well-documented aspect of the Windows™ application programmer interface which is very familiar to those skilled in the art). Accordingly, when it detects a need to change to a different real font segment the invention must somehow invoke a font dialog box. But, because this is not expected by user, the dialog box pop-up action must be suppressed. The solution is to substitute for the Windows ChooseFonts function a custom ChooseFonts function capable of determining whether or not a dialog box should pop-up.

Figure 4:
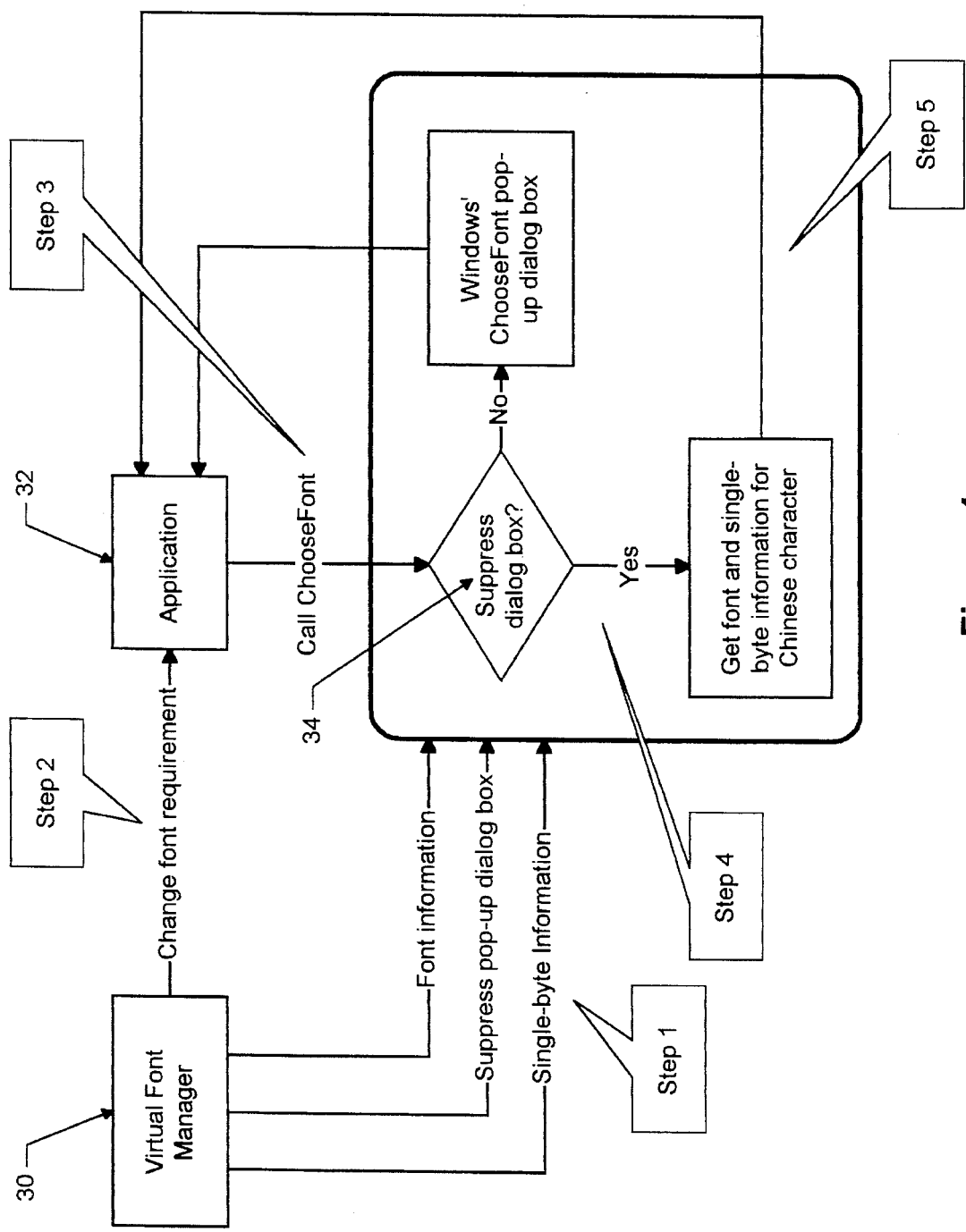
FIG. 4 is a flow chart illustrating the sequence of steps used by the present invention to switch fonts in a manner transparent to the user by suppressing display of the dialog boxes used by some application software to enable user-controlled font switching, while mimicking the action of such dialog boxes to cause the software to switch fonts.

FIG. 4 illustrates the procedure. Upon receipt of a Chinese character code from the input system (Box 30) the invention's virtual font manager determines which real font-segment contains the input Chinese character. If the input character resides in a real font segment other than the one which is currently in use then a special ChooseFonts call is substituted for the conventional Windows' ChooseFonts library call in order to suppress display of the pop-up dialog box. Note that change font calls which do not originate from the invention's virtual font manager are handled by the conventional Windows' ChooseFonts library call, thus preventing any interference with the conventional user-activated manual font switching procedure.

Thus, when the invention issues a change font command the application software (Box 32) calls the ChooseFonts function as usual, but the substituted ChooseFonts function executes, not the conventional Windows ChooseFonts function. The substituted ChooseFonts function checks to see if it previously received a suppress pop-up dialog box signal (decision Box 34). If the answer is "no", then the request to change fonts must have been manually activated by the user, so the action performed is identical to the performed by the conventional Windows ChooseFonts function; namely, the pop-up dialog box appears to receive the user's font switching commands. But, if the answer is "yes", then the request to change fonts must have come from the invention's virtual font manager. In this case, the action performed by the invention's substituted ChooseFont function is identical to that of the conventional Windows ChooseFonts function except that the pop-up dialog box does not appear.

Substituting Single Virtual Font Name For Family of Real Font Segment Names

As previously described, each virtual font (which may comprise 13,000 or more characters) is mapped to a multiplicity of real font segments. Since each real font segment contains only 256 characters, there will typically be many real font segments for each virtual font. (Recall the previous example of 70 separate real font segments for a single virtual font containing 13,160 Chinese characters). Normally, the user may inspect the names of all of the available 256-character real font segments via the font manipulation mechanism provided by the application software. As previously explained, one of two such mechanisms are typically provided: a pull down menu having a scrollable list of the available font names; or, a dialog box listing the available font names.

In either case, it is undesirable that the user see the names of the different real font segments comprising each virtual font. If the real font segment names were visible to the user then, in order to review the available fonts, select a new font, etc., the user would have to scroll through large families of real font segment names for each virtual font. This would be both tedious and distracting to the user. For example, a single virtual font named "Fang-Song" might consist of 70 real font segments named "Fang-Song 1", "Fang-Song 2", . . . , "Fang-Song 70".

The present invention hides the real font segment names and substitutes a single occurrence of the corresponding virtual font name so that, upon inspecting the list of available fonts, the user sees only the virtual font name "Fang-Song", not the names of any of the 70 real font segments which collectively comprise that virtual font. This is done without affecting display of the names of any conventional 256 character English fonts such as "Arial", "Courier", "Times Roman", etc. which the user may have installed and which therefore coexist with one or more Chinese virtual fonts in the particular user's computer system.

This is accomplished in one of two different ways, again depending upon the font manipulation mechanism provided by the application software, as will now be described.

1. Pull-Down Menu Font Manipulation

Applications which use the pull down menu font manipulation mechanism usually call the Windows™ AppendMenu function to insert new font names into the list of available fonts which the user inspects. The present invention adds, before the call to the Windows™ AppendMenu function, a call to a custom AppendMenu function which detects real font segment names, prevents their insertion into the font list, and inserts instead the name of the corresponding virtual font.

Figure 5:
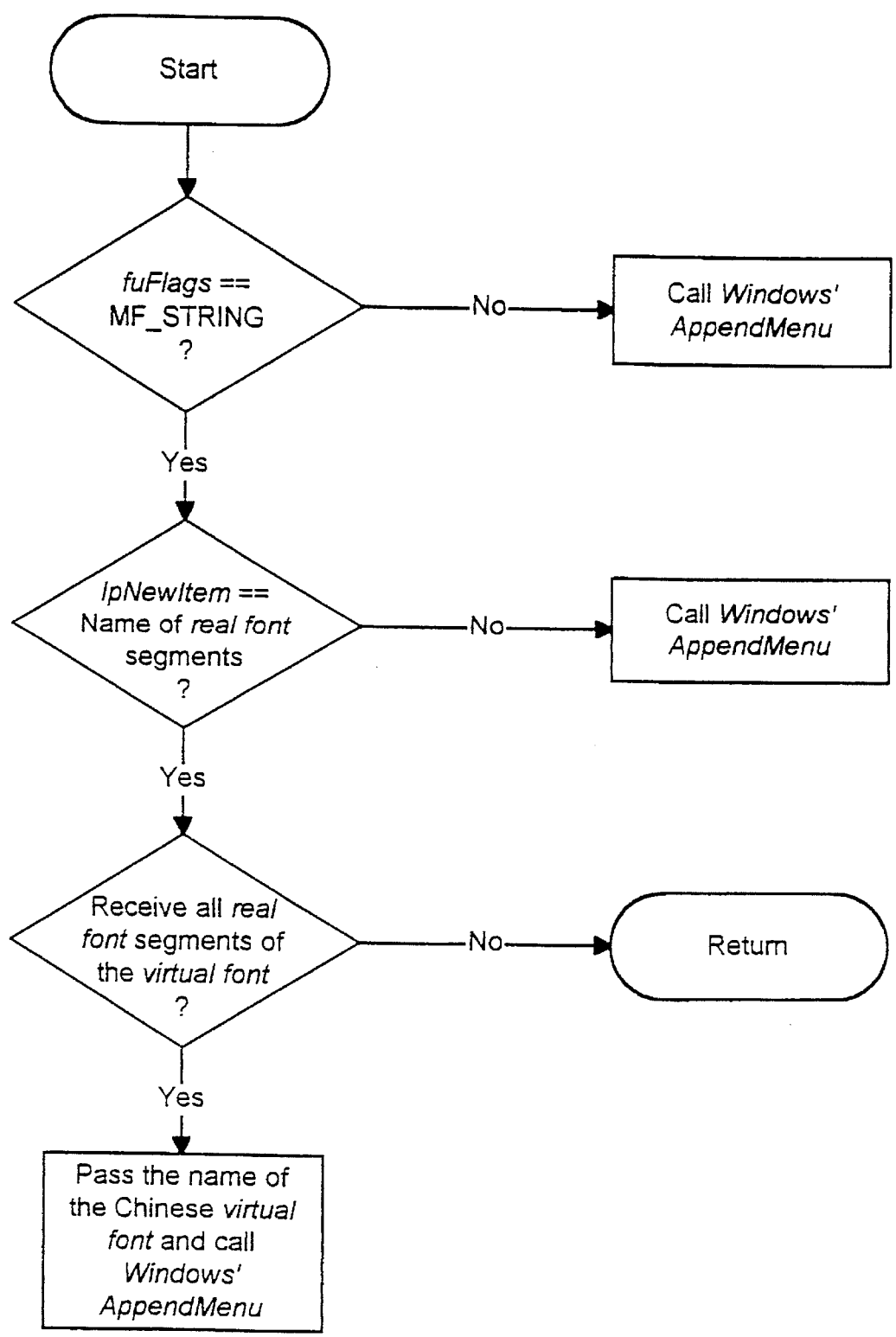
FIG. 5(a) is a flow chart illustrating the sequence of steps used by the present invention to display to the user, on a pull down menu listing available fonts, only the virtual font names, not the names of the many real font segments which collectively comprise each virtual font.
FIG. 5(b) is a flow chart illustrating the sequence of steps used by the present invention to display to the user, in a dialog box listing available fonts, only the virtual font names, not the names of the many real font segments which collectively comprise each virtual font.
Figure 5:
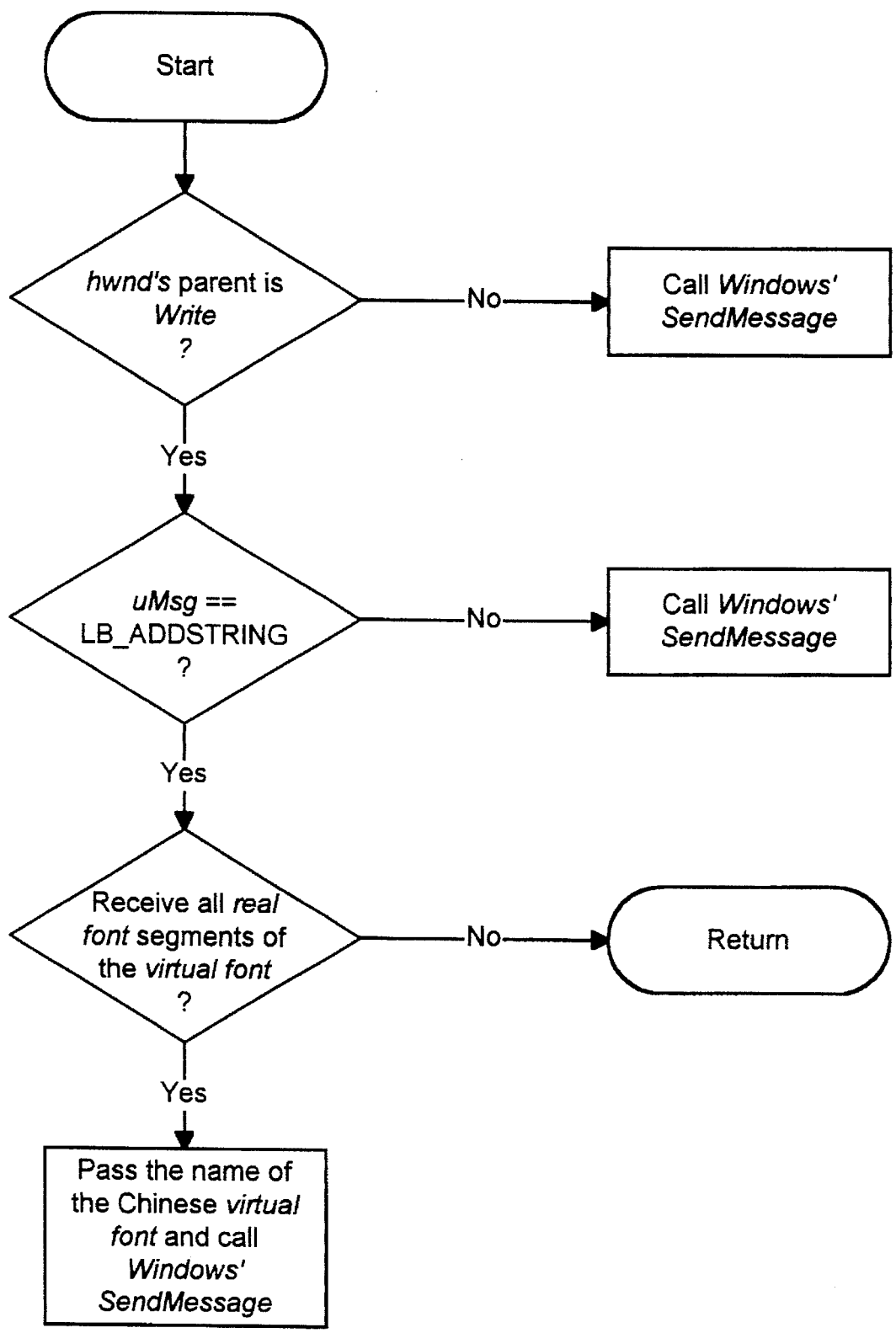

As depicted in FIG. 5(a), the invention's custom Append-Menu function first checks whether the function's second parameter fuFlags=MF_STRING. If so, a new item (STRING) is added into the font list; otherwise control passes to the Windows™ AppendMenu function. The custom function then checks whether the function's fourth parameter lpNewItem (pointer variable) points to the name of a real font segment. If so, the inserting procedure is bypassed (i.e. the name of the real font segment pointed to is not added to the font list). After cycling through the names of all of the real font segments making up a virtual font, the custom AppendMenu function passes the virtual font's name to the Windows™ AppendMenu function, which adds that one name to the font list.

2. Dialog Box Font Manipulation

Applications which use the dialog box font manipulation mechanism usually call the Windows™ SendMessage function to insert new font names into the font list. The present invention adds, before the call to the Windows™ SendMessage function, a call to a custom SendMessage function which detects real font segment names, prevents their insertion into the font list, and inserts instead the name of the corresponding virtual font.

As depicted in FIG. 5(b), the invention's custom Send-Message function first checks whether the active window needs to hide a family of real font segment names. This is done by checking whether the function's first parameter hwnd's parent is MS-Write, and so on. If so, a check is made to see whether the function's second parameter uMsg= LB_ADDSTRING. If so, a new item (STRING) is added into the font list; otherwise control passes to the Windows™ SendMessage function. The custom function then checks whether its fourth parameter lParam (a pointer variable) points to the name of a real font segment. If so, the inserting procedure is bypassed (i.e. the name of the real font segment pointed to is not added to the font list). After cycling through the names of all of the real font segments making up a virtual font, the custom SendMessage function passes the virtual font's name to the Windows™ SendMessage function, which adds that one name to the font list.

Switching Between Virtual Fonts

It will be understood that, with each virtual font comprising many different real font segments, even simple, short Chinese phrases or sentences will typically consist of characters from different real font segments. To the user, all such characters belong to a single virtual font such as "Fang-Song 7". But, internally, the first character may belong to the real font segment named "Fang-Song 4", the second character may belong to the real font segment named "Fang-Song 7", etc.

As previously explained, Western computer software, such as that designed for use with the popular Microsoft® Windows™ environment, relies upon single byte "real" fonts consisting of only 256 characters per font and is incapable of managing virtual fonts. Conventionally, if a user decides to assign a different (real) font to a particular passage of text, that passage is simply selected, together with the new (real) font's name and the assignment is automatically completed. However, this technique does not work if the selected text passage consists of characters which are themselves drawn from different real font segments such as "Fang-Song 4", "Fang-Song 7", etc. Thus, a problem arises if the user decides to change a particular passage of text from one virtual font to another.

This problem can be solved if the real font segments comprising each virtual font are structured such that each Chinese character maintains the same position in each font, as illustrated in FIGS. 3 and 6. For example, in FIG. 3, each row in the table represents one real font segment made up of 256 columns, with each column containing one of 256 possible characters. In a virtual font, the position of each Chinese character is defined by the row and column in which that character appears. For reference purposes, the standard character fonts "Arial" and "Courier" also appear in FIG. 3. It can thus be seen that the character position occupied in the "Arial" or "Courier" fonts by the upper case letter "A" is occupied in real font segment 1 of the "Fang-Song" font by the same Chinese character which occupies the same column of real font segment 1 of the "Hei-Ti" and "Song-Ti" fonts. Similarly, the character position occupied in the "Arial" or "Courier" fonts by the lower case letter "y" is occupied in real font segment "n" of the "Fang-Song" font by the same Chinese character which occupies the same column of real font segment "n" of the "Hei-Ti" and "Song-Ti" fonts, and so on. Accordingly, the character positions are independent of the particular virtual font in use. This enables the user to change a particular passage of text from one virtual font to another, even though that passage may (and probably will) consist of characters drawn from different real font segments.

From the user's standpoint, the change is accomplished in precisely the same manner as described above for the case in which the user assigns a different (real) font to a particular passage of text comprising characters which are all drawn from the same (real) font. That is, the user simply selects the particular passage of text (by highlighting the selected block of text in well known fashion) and then selects a new virtual font name via the font manipulation mechanism provided by the application software. The invention then inspects each character in turn and converts it from the real font segment in the "old" virtual font to the corresponding real font segment in the "new" virtual font. This procedure is transparent to user, who remains unaware of any changes in real font segments; the user sees only the name of the new virtual font as applying to the selected text passage to which the virtual font change was applied as aforesaid.

Figure 7:
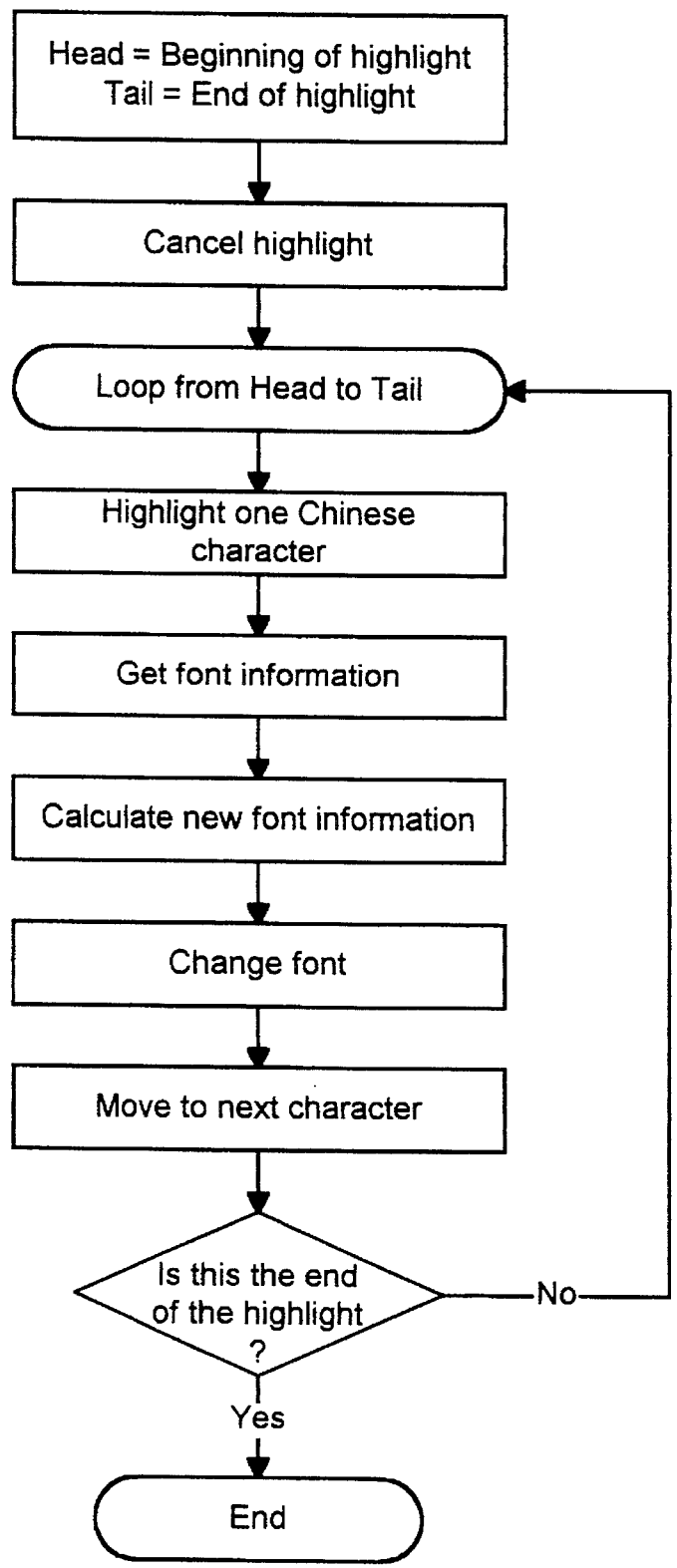
FIG. 7 is a flowchart illustrating the procedure used to change text passages from one virtual font to another, even if the passages consist of characters drawn from different real font segments.

More particularly, the beginning and the end of the highlighted block of text define the starting point and the ending point for the virtual font conversion procedure, as is now described with reference to FIG. 7. Transparently to user, the first Chinese character in the block is highlighted. As indicated above, each character will retain the same numbered position in the same numbered real font segment, irrespective of which virtual font is the "old" one and which is to be the "new" virtual font. Then the procedure converts the real font segment from the "old" virtual font (such as "Fang-Song 4") to the corresponding real font segment in the "new" virtual font (such as "Song-Ti 4"). Windows' applications can handle this easily since the single byte information defining the character's (1 out of 256) position within the real font segment does not change. The foregoing procedure is repeated, character by character until the end of the highlighted block is reached.

Quick Access to Core Characters

Although each virtual font may contain up to about 13,000 Chinese characters as aforesaid, less than 3,000 characters are commonly used, with a core group of about 1,200 characters making up about 95% of the characters required in most situations. Accordingly, in addition to maintaining a full complement of real font segments for each virtual font as described above, the invention also groups the 1,200 core characters aforesaid into an additional 7 real font segments. These 7 segments are the first ones loaded into high speed random access memory (RAM) storage. This maximizes the likelihood that the core characters will all be available in RAM for fast access.

After the 7 core segments are loaded into RAM as aforesaid, the full complement of real font segments comprising the particular virtual font is then loaded into RAM, up to the RAM capacity of the user's computer system. Thus, although the user's computer system may have insufficient RAM to simultaneously contain the entire virtual font, there should at least be sufficient RAM to contain the 7 segments containing the core characters. This in turn affords rapid access to the majority of characters required in most applications.

More particularly, if the user selects one of the core characters, the invention's virtual font manager obtains that character from the appropriate one of the 7 core character segments, not from one of the real font segments comprising the virtual font. If the latter approach were taken, and if the user's computer system did not have enough RAM to simultaneously contain the full complement of real font segments making up the virtual font, then it may be discovered that the desired font segment is not currently in RAM. This would result in a delay while the font segment containing the desired character is retrieved from a slower speed device (such as a hard disk) and loaded into RAM. The invention minimizes such delays by giving priority to the loading into RAM of the 7 core character segments, thus maximizing the likelihood that the commonly used core characters are always available for retrieval from high speed RAM. Although requiring redundant usage of 7×256=1,792 bytes of RAM, an overall improvement in performance is achieved in most situations.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of interfacing between a computer user and a computer application program to enable said user to manipulate, as one virtual font, a number "N" of special characters exceeding the number "X" of standard characters which said program can represent in one font, said program having user-activatable means for switching between different stored fonts to select a currently active font and font switching display means for enabling said user to monitor said font switching and selection, said method comprising the computer-implemented steps of:
   a. dividing said special characters into a plurality of individually named font segments, each of said segments containing "X" characters;
   b. storing said font segments with said stored fonts;
   c. for each character input by said user:
      i. determining whether said input character is one of said special characters;
      ii. if said input character is not one of said special characters, terminating performance of said method;
      iii. if said input character is one of said special characters:
         (1) determining which one of said stored font segments contains said input character;
         (2) determining said currently active font from which characters are currently being selected by said program;
         (3) if said font segment containing said input character is said currently active font, terminating performance of said method;
         (4) if said font segment containing said input character is not said currently active font, automatically activating said font switching means to select said font segment containing said input character as said currently active font while suppressing activation of said font switching display means; and,
         (5) terminating performance of said method.

2. A method as defined in claim 1, wherein:
   a. said font switching display means comprises a sequential, "pull down" menu listing said stored fonts and said stored font segments;
   b. said font switching means may be activated by said user selecting one of said menu-listed fonts according to said selected font's position in said menu; said method further comprising after said step 1.b and before said step 1.c, creating and storing a table identifying the position of each of said stored fonts and each of said stored font segments in said menu; wherein said selection of said font segment during said step 1.c.iii.(4) further comprises examining said table to determine the position in said menu of said font segment containing said input character, opening said menu, and selecting one of said font or said font segment occupying said determined position.

3. A method as defined in claim 1, wherein said font switching display means comprises a user-activated pop-up dialog box containing a sequential list of said stored fonts and said stored font segments, wherein said selection of said font segment during said step 1.c.iii.(4) further comprises delivering to said application program a parameter representative of said font segment containing said input character, while suppressing activation of said pop-up dialog box.

4. A method as defined in claim 2 or 3, further comprising:
   a. after said step 1.a and before said step 1.c, assigning a single virtual font name to said plurality of individually named font segments;
   b. constructing said sequential list by:
      i. differentiating said stored fonts and said stored font segments;
      ii. upon differentiation of one of said stored fonts, adding said stored font's name to said sequential list;
      iii. upon detection of one of said stored font segments;
         (1) preventing addition of said stored font segment's name to said sequential list;
         (2) disregarding all of said stored font segments associated with said detected stored font segment to prevent addition of said associated stored font segment names to said sequential list; and,
         (3) adding to said sequential list a single occurrence of said virtual font name.

5. A method as defined in claim 2 or 3, further comprising, at any time after said character input by said user, enabling said user to apply any one of a plurality of different fonts to any selected grouping of said special characters by:
   a. repeating steps 1.a through 1.c inclusive a selected number of times to create a selected number of different virtual fonts, each containing an identical plurality of individually named font segments of said special characters, with each of said characters assigned to the same sequential one of said font segments and to the same sequential position within said same sequential one of said font segments;
   b. assigning a distinct virtual font name to each of said virtual fonts; and,
   c. upon identification, by said user, of said selected grouping of said special characters, substituting, for each one of said characters within said selected grouping, identification of a particular one of said virtual fonts identified by said user, while retaining for each such character said sequential identification of said font segment and position of said character.

6. A method as defined in claim 2 or 3, further comprising:
   a. identifying a restricted number of commonly used core characters;
   b. dividing said core characters into a plurality of individually named core font segments, each of said core font segments containing "X" characters;
   c. loading said core :font segments before loading any of said font segments which are not core font segments.

7. A method as defined in claim 6, further comprising, after said step 1.c.ii and before said step 1.c.iii:
   a. determining whether said input character is one of said core characters;
   b. if said input character is not one of said core characters, continuing performance of said method with said step 1.c.iii;
   c. if said input character is one of said core characters:
      (1) determining which one of said loaded core font segments contains said input character;
      (2) determining a currently active font from which characters are currently being selected by said program;
      (3) if said core font segment containing said input character is said currently active font determined during said step 7.c(2), terminating performance of said method; and,
      (4) if said core font segment containing said input character is not said currently active font, activating said font switching means to select said core font segment containing said input character as said currently active font while suppressing activation of said font switching display means.

* * * * *